(12) United States Patent
Rodrigues et al.

(10) Patent No.: US 8,367,182 B2
(45) Date of Patent: Feb. 5, 2013

(54) WRAPPABLE TEXTILE SLEEVE WITH INTEGRAL ATTACHMENT AND CLOSURE DEVICE

(75) Inventors: Thierry Rodrigues, Ecouen (FR); Phillippe Van Hootegem, Crepy-en-Valois (FR); Amelic Simoens-Seghers, Compiegne (FR)

(73) Assignee: Federal-Mogul Powertrain, Inc., Southfield, MI (US)

( * ) Notice: Subject to any disclaimer, the term of this patent is extended or adjusted under 35 U.S.C. 154(b) by 199 days.

(21) Appl. No.: 12/953,788

(22) Filed: Nov. 24, 2010

(65) Prior Publication Data
US 2011/0123759 A1    May 26, 2011

Related U.S. Application Data

(66) Substitute for application No. 61/264,396, filed on Nov. 25, 2009.

(51) Int. Cl.
*B32B 3/06* (2006.01)
*B32B 3/08* (2006.01)
*H02G 3/04* (2006.01)

(52) U.S. Cl. ............... 428/100; 428/99; 174/135
(58) Field of Classification Search .......... 428/99, 428/100; 174/135, 36; 248/68.1, 205.2; 138/110, 167
See application file for complete search history.

(56) References Cited

U.S. PATENT DOCUMENTS

| | | | |
|---|---|---|---|
| 5,027,862 A | 7/1991 | Layboum | |
| 5,147,216 A | 9/1992 | Shotey | |
| 5,273,454 A | 12/1993 | Shotey | |
| 5,600,098 A | 2/1997 | Kazaks | |
| 6,111,194 A | 8/2000 | Kroulik | |
| 6,328,080 B1 | 12/2001 | Winters | |
| 6,384,326 B1 | 5/2002 | McFadden et al. | |
| 6,983,767 B2 | 1/2006 | Rickards | |
| 7,086,422 B2 | 8/2006 | Huber et al. | |
| 7,119,279 B2 * | 10/2006 | Niehaus et al. | 174/72 A |
| 7,550,666 B2 | 6/2009 | Burland et al. | |
| 7,637,288 B2 | 12/2009 | Kressierer/Huber et al. | |
| 2004/0099426 A1 | 5/2004 | Bryl et al. | |
| 2008/0164060 A1 | 7/2008 | Burland | |

FOREIGN PATENT DOCUMENTS

| | | |
|---|---|---|
| DE | 3107557 A1 | 9/1980 |
| DE | 10200401884 A1 | 11/2005 |
| GB | 2427746 A | 1/2007 |
| WO | 93/14253 A1 | 7/1993 |

* cited by examiner

*Primary Examiner* — Alexander Thomas
(74) *Attorney, Agent, or Firm* — Robert L. Stearns; Dickinson Wright, PLLC

(57) ABSTRACT

A wrappable textile tubular sleeve for routing and protecting elongate members is provided. The sleeve includes an elongate wall constructed from interlaced yarns. The wall has opposite inner and outer edges extending between opposite ends of the sleeve parallel to a central longitudinal axis of the sleeve. The wall also has oppositely facing inner and outer faces extending between the inner and outer edges. The inner face bounds an inner cavity of the tubular sleeve upon wrapping the outer edge in outwardly overlapping relation with the inner edge about the central longitudinal axis. Further, an elongate fastener extends parallel to the central longitudinal axis adjacent the outer edge. The fastener faces outwardly from the outer face and is configured for attachment to an external support member.

12 Claims, 4 Drawing Sheets

WRAPPABLE TEXTILE SLEEVE WITH INTEGRAL ATTACHMENT AND CLOSURE DEVICE

CROSS-REFERENCE TO RELATED APPLICATION

This application claims the benefit of U.S. Provisional Application Ser. No. 61/264,396, filed Nov. 25, 2009, which is incorporated herein by reference in its entirety.

BACKGROUND OF THE INVENTION

1. Technical Field

This invention relates generally to textile sleeves for protecting elongate members, and more particularly to a wrappable textile sleeve having an integral attachment device for attachment to a support surface and closure device for maintaining the sleeve in a wrapped configuration about the elongate member.

2. Related Art

It is known to wrap wires and wire harnesses in wrappable protective textile sleeves to provide protection to the wires against abrasion, fluid, thermal and electromagnetic interference effects. The textile sleeves are typically woven, braided, knitted, or crocheted, and then cut to a desired length, whether in manufacture or in the field. Further, the open construction, wrappable sleeves are known to be constructed at least in part from a heat-settable yarn, thereby allowing the wall of the sleeve to be heat-set into a self-wrapping, also referred to as a self-curling, configuration wherein opposite lengthwise extending edges of the sleeve overlap one another to completely enclose the elongate members being protected. Further yet, to ensure the wall of the sleeve remains properly wrapped about the elongate members, it is known to use closure devices, e.g. snaps, hook and loop fasteners, adhesive tape, and lacing tape, to keep the longitudinally extending free edges of the sleeve in overlapped relation with one another. Lacing tape, also referred to as 'string', is commonly used in aerospace applications wherein the lacing tape is generally provided on a bobbin and cut with scissors to provide the length necessary to close the sleeve within the technical specifications. The string is typically wrapped about the circumference of the wrapped sleeve wall whereupon free ends of the string are tied to form a knot, thereby maintaining the wall in its closed configuration. Although the string is effective to perform its intended function, it requires carrying inventory of separate string components, given it is supplied as a separate component from the sleeve. Further, the separate string component requires manual manipulation, including possible cutting to length and measurement to ensure the string is properly spaced along the length of the sleeve during application.

In addition, the wrappable sleeves, upon being wrapped about the elongate members, often need to be attached to a support member of the particular application to prevent the sleeve from moving relative to the support member. For example, the support member could be a frame member of an automotive vehicle or aircraft. In non-aircraft applications, the frame can often be constructed with fastener holes to facilitate attaching the sleeve to the frame via separate clips, for example. However, in the manufacture of frame structure for aircraft applications, holes are typically unwelcome, thereby making attaching the sleeve to the frame more challenging.

SUMMARY OF THE INVENTION

One aspect of the invention provides a wrappable textile tubular sleeve for routing and protecting elongate members. The sleeve includes an elongate wall constructed from interlaced yarns. The wall has opposite inner and outer edges extending between opposite ends of the sleeve parallel to a central longitudinal axis of the sleeve. The wall also has oppositely facing inner and outer faces extending between the inner and outer edges. The inner face bounds an inner cavity of the tubular sleeve upon wrapping the outer edge in outwardly overlapping relation with the inner edge about the central longitudinal axis. Further, an elongate fastener extends parallel to the central longitudinal axis adjacent the outer edge. The fastener faces outwardly from the outer face and is configured for attachment to an external support member.

In accordance with another aspect of the invention, the fastener is provided as one portion of a hook and loop fastener adjacent the outer edge. Accordingly, upon wrapping the wall about elongate members to be protected, the one portion of the hook and loop fastener is facing outwardly for ready attachment to another portion of the hook and loop fastener on a support member, such as an automotive vehicle or aircraft frame, for example.

In accordance with another aspect of the invention, a wrappable tubular sleeve for routing and protecting elongate members includes an elongate wall having opposite inner and outer edges extending parallel to a central longitudinal axis of the sleeve between opposite ends. The wall has oppositely facing inner and outer faces extending between the inner and outer edges. The inner face bounds an inner cavity of the tubular sleeve upon wrapping the outer edge in outwardly overlapping relation with the inner edge about the central longitudinal axis. An elongate fastener is attached to the outer face of the wall. The fastener extends parallel to the central longitudinal axis and faces outwardly from the outer face for attachment to an external support member. Further, a closure device is integrally attached to the wall. The closure device extends transversely to the fastener and extends circumferentially about the wall for attachment to itself to maintain the inner and outer edges in overlapping relation.

Accordingly, the invention provides a wrappable textile sleeve that can be readily maintained in its wrapped configuration about elongate members to be protected. The closure device, being attached to the wall of the sleeve, reduces the complexity of assembly and maintaining the wall in its wrapped configuration, while also reducing the number of components in inventory. Further, with the closure device being attached to the wall, the closure mechanisms are pre-spaced in predetermined relation to one another, further reducing the complexity of assembly.

BRIEF DESCRIPTION OF THE DRAWINGS

These and other aspects, features and advantages of the invention will become readily apparent to those skilled in the art upon viewing the following detailed description of presently preferred embodiments and best mode, appended claims, and accompanying drawings, in which:

DETAILED DESCRIPTION OF PREFERRED EMBODIMENTS

Figure 1:
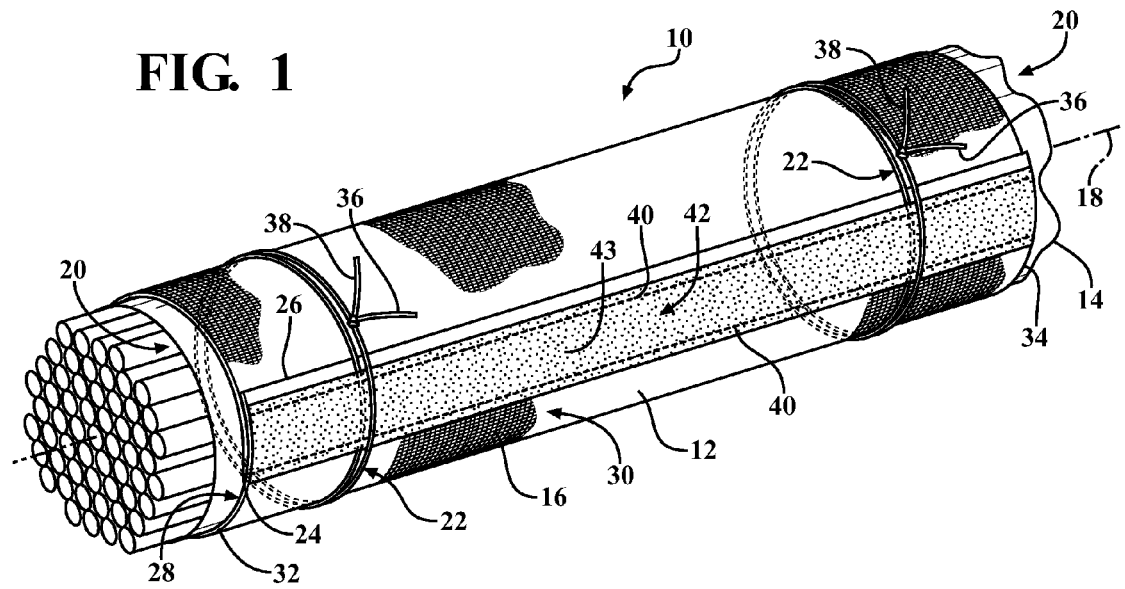
FIG. 1 is a schematic perspective partial view of a wrappable textile sleeve constructed in accordance with one aspect of the invention.
Figure 2:
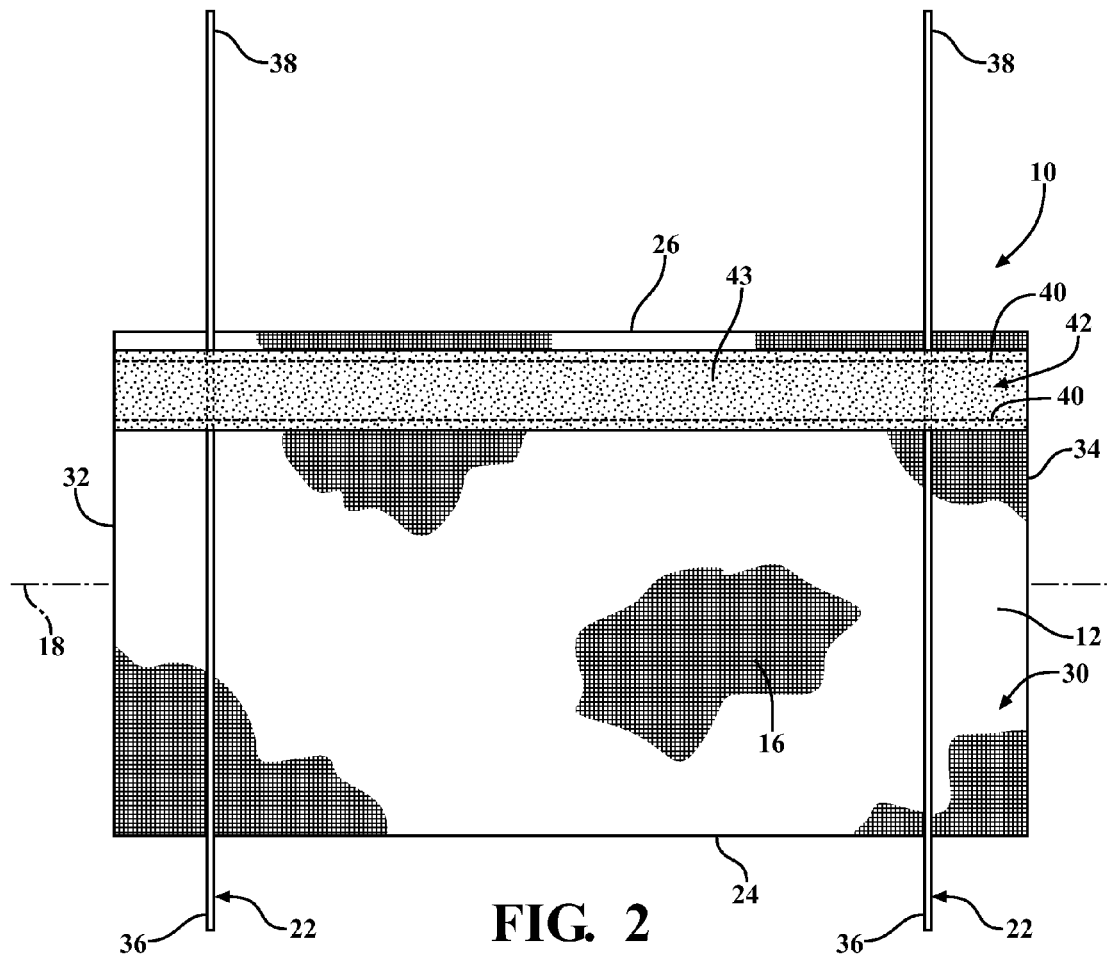
FIG. 2 is a schematic plan view of an outer face of the sleeve of FIG. 1 with the sleeve being shown in an unwrapped configuration.

Referring in more detail to the drawings, FIG. 1 shows a schematic view of wrappable textile sleeve, referred to hereafter as sleeve 10, constructed in accordance with one aspect of the invention. The sleeve 10 has a wrappable elongate wall 12 for routing and protecting elongate members, such as wires or a wire harness 14, for example. The elongate wall 12 is constructed from at least one yarn 16 interlaced with itself or a plurality of yarns 16 interlaced with one another. The wall 12 is wrapped, also referred to as curled, about a central longitudinal axis 18 to provide an enclosed tubular inner cavity 20. The cavity 20 is readily accessible along the longitudinal axis 18 of the sleeve 10 so that the elongate members 14 can be readily disposed radially into the cavity 20, and conversely, removed from the cavity 20, such as during service. To facilitate maintaining the wall 12 in its wrapped tubular configuration about the elongate member 14, at least one closure device 22, represented in FIGS. 1-3, by way of example, in the form of an elongate closure device string member, and represented here as a plurality of string members 22, are preferably attached to the wall 12 during construction of the sleeve 10. The string members 22 extend transversely or substantially transversely to the central longitudinal axis 18 so they can be wrapped circumferentially about the wall 12 and subsequently attached to one another, such as by being tied together. Accordingly, the sleeve 10 is constructed having at least one closure member 22 integrally attached to the wall 12 to provide a convenient mechanism to maintain the sleeve 10 in its protective configuration about the elongate members 14.

The wall 12 can be constructed having any suitable size, including length, width, wherein the width directly corresponds to overall diameter of sleeve upon being "cigarette" wrapped, and wall thickness. The wall 12 has opposite inner and outer edges 24, 26, respectively, with oppositely facing inner and outer faces 28, 30, respectively, extending between the edges 24, 26. The edges 24, 26 extend parallel or substantially parallel to the central axis 18 and terminate at opposite ends 32, 34 of the wall 12. The wall 12 can be constructed as a generally flat body that can be subsequently wrapped while maintaining the opposite edges 24, 26 in generally parallel relation with one another and the central axis 18 via an externally applied force, or it can be constructed as a self-wrapping body, as desired. If constructed as a self-wrapping body, at least some of the weft, circumferentially extending yarns 16 are provided as heat-settable yarns that are heat-set to retain a curled configuration about the central axis 18 to bias the wall 12 into a self-wrapping tubular configuration. When the wall 12 is in its self-wrapped tubular configuration, generally free from any externally applied forces, the outer side 26 extends beyond and overlaps the inner side 24 to fully enclose the cavity 20 circumferentially, and thus, the wall 12 provides protection against external elements about a full circumference of the wall 12 to the wires 14 contained in the cavity 20. The sides 24, 26, when desired, are readily extendable away from one another under an externally applied force to at least partially open and expose the cavity 20. Accordingly, the wires 14 can be readily disposed into the cavity 20 during assembly or removed from the cavity 20 during service. Upon releasing the externally applied force, the sides 24, 26 return automatically under a bias imparted by the heat-set yarns 16 to their relaxed, overlapping self-wrapped position.

The wall 12 can be constructed from multifilament and/or monofilament yarns, with at least one or more of the yarns 16 in the self-wrapping embodiment being heat-settable. For example, one or more of the yarns 16 can be provided as a heat-settable polymeric material, such as polyphenylene sulfide (PPS), for example, which can be heat set at a temperature of about 200-225 degrees Celsius. The yarns 16 forming the wall 12 can be interlaced using a variety of processes, such as weaving, knitting, crocheting or braiding, as desired.

Upon forming the textile wall 12, the closure members 22 are integrally attached thereto. The closure string members 22 are attached to the wall 12, shown as being attached adjacent the outer edge 26, such that upon wrapping the wall 12 about the elongate members 14, the string members 22 are free to be wrapped circumferentially about the wall 12 with opposite ends 36, 38 of the respective string members 22 being tied together. The string members 22 can be provided of any desired length, depending on how may times the string members 22 are to be wrapped about the wall 12, shown here as twice, by way of example and without limitation.

In one preferred embodiment, the string members 22 are attached to the outer face 30 of the wall 12 via a stitched yarn 40. In addition, the string members 22 are represented as being captured and stitched between a fabric 42 and the outer face 30 of the wall 12, wherein the fabric provides an elongate fastener 43 extending parallel or substantially parallel to the central axis 18, wherein the fastener 43 is represented as being one of a hook or loop portion 43 of a hook and loop type fastener, for example. The fastener 43 can be provided as a separate component that is attached to the fabric 42, or the fabric can be provided as the fastener 43. The fabric 42 is shown as extending between the opposite ends 32, 34 of the wall 12 adjacent the outer edge 26, and shown as being flush with the outer edge 26. The fabric 42, and associated fastener 43, can be provided having any suitable width, such as about ½-1 inch, for example. However, the fabric 12 could be provided as extending less than completely between the ends 32, 34, and further, could be provided as separate segments spaced from one another along the length of the wall 12, if desired. In construction, the string members 22 are preferably sandwiched between the fabric 42 and the wall 12, and then subsequently the fabric 42 and the string members 22 are fixedly attached to the wall 12 via the stitched yarn 40. It should be recognized that the number of stitched rows of yarn 40 can be fabricated as desired, shown here a two, with one row extending adjacent each longitudinally extending edge of the fabric 42. Further, it should be recognized that the string members 22 could be stitched to an outer surface of the fabric 42, if desired, though it is believed that being sandwiched between the fabric 42 and the wall 12 provides enhanced retention and avoids interfering with the fastener 43 on the outer surface of the fabric 42.

With the fabric 42 being provided as one of a hook or loop portion, the sleeve 10 can be readily attached to a support member, also referred to as structure 44 (FIG. 3), such as a frame member of an automotive vehicle or aircraft, for example. To facilitate attachment of the sleeve 10 to the structure 44, the other of the hook or loop portion 46 is attached to the structure 44, such as by being preassembled to the frame member during manufacture of the frame member or thereafter. Accordingly, the sleeve 10 can be readily attached to the frame member 44 in a quick, economical manner, without having to form openings in the frame member 44 by bringing the first hook or loop fastener 43 on the sleeve 10 into fastening engagement with the other of the second hook or loop fastener 46 on the frame member 44.

Figure 4:
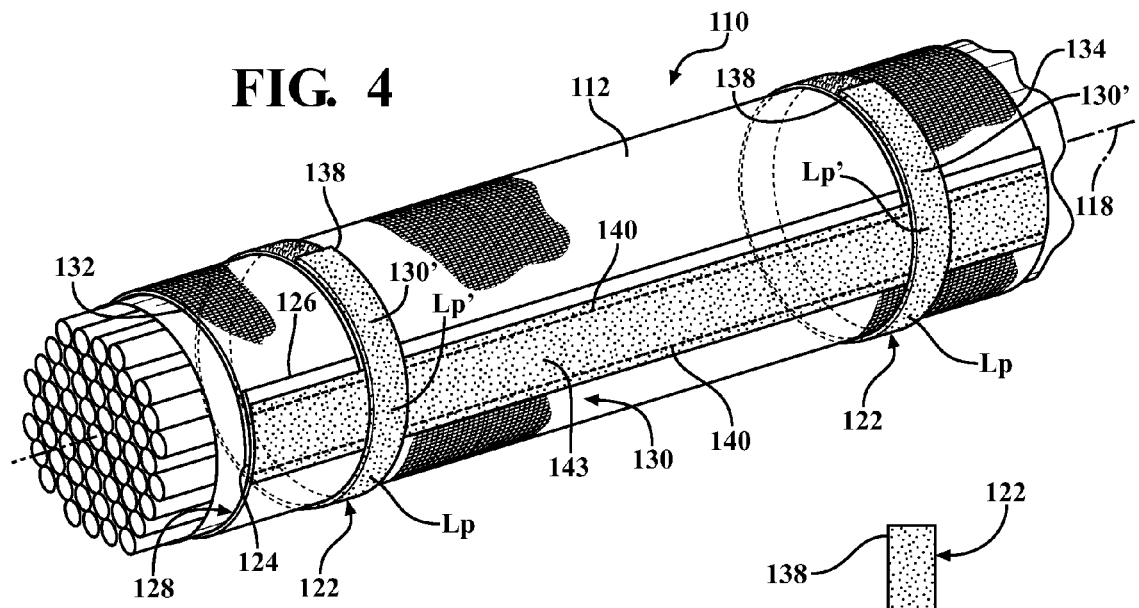
FIG. 4 is a schematic perspective partial view of a wrappable textile sleeve constructed in accordance with another aspect of the invention.
Figure 5:
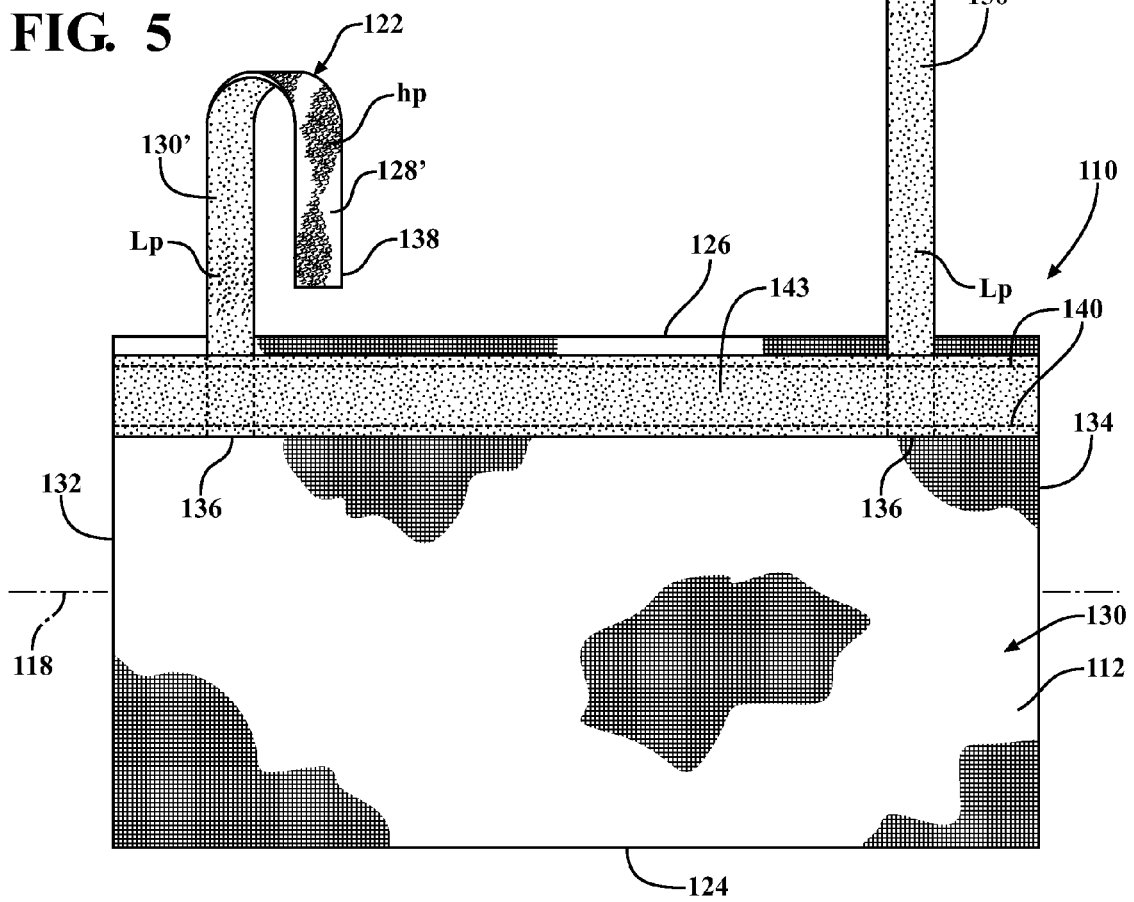
FIG. 5 is a schematic plan view of an outer face of the sleeve of FIG. 4 with the sleeve being shown in an unwrapped configuration.

In FIGS. 4 and 5, a sleeve 110 constructed in accordance with another aspect of the invention is illustrated, wherein the same reference numerals, offset by a factor of 100, are used as above to identify similar features. The sleeve 110 has a wall 112 constructed the same as discussed above. Accordingly, the wall 112 has opposite inner and outer edges 124, 126, respectively, with oppositely facing inner and outer faces 128, 130, respectively, extending between the edges 124, 126. The edges 124, 126 extend parallel or substantially parallel to the central axis 118 and terminate at opposite ends 132, 134 of the wall 112.

At least one, and shown as a pair of closure members 122 are attached to the outer face 130 of the wall 112, such as via a stitched yarn 140. The closure members 122 are provided as elongate, flexible straps 122. The straps 122 extend between opposite ends 136, 138, where one of the ends 136 is shown as being attached adjacent the outer edge 126. It should be recognized that the straps 122 could be otherwise, such as by being attached at a location between the opposite ends 136, 138, thereby allowing the opposite ends 136, 138 to extend laterally away from the outer side 126. In addition, the end 136 is represented as being captured and stitched between an elongate fastener 143 and the outer face 130 of the wall 112, wherein the fastener 143 is represented as being one of a hook or loop portion 143 of a hook and loop type fastener, for example. The straps 122 have opposite inner and outer faces 128', 130', wherein the inner face 128', as best shown in FIG. 5 wherein the left strap 122 is twisted to show the inner face 128', is essentially an extension of the inner face 128 of the wall 112, and wherein the outer face 130' is essentially an extension of the outer face 130 of the wall 112. The inner face 128' has one of a first hook portion (hp) or loop portion (lp), shown as being adjacent the free end 138. The outer face 130' has one of a first loop portion (lp) or hook portion (hp), shown as being adjacent the fixed end 136, wherein the respective first hook portion (hp) and the first loop portion (lp) of each strap 122 are configured for attachment to one another upon the straps 122 being wrapped circumferentially about the wall 112. Accordingly, if the inner face 128' is provided with a hook portion (hp), then the outer face 130 is provided with a loop portion (lp), and vise-versa. As shown, the first hook portion (hp) extends over the full inner face 128' and the first loop portion (lp) extends over the full outer face 130'. As such, when the respective ends 136, 138 are brought into overlapping abutment with one another, the respective loop portion (lp) and hook portion (hp) are fastened together.

Figure 3:
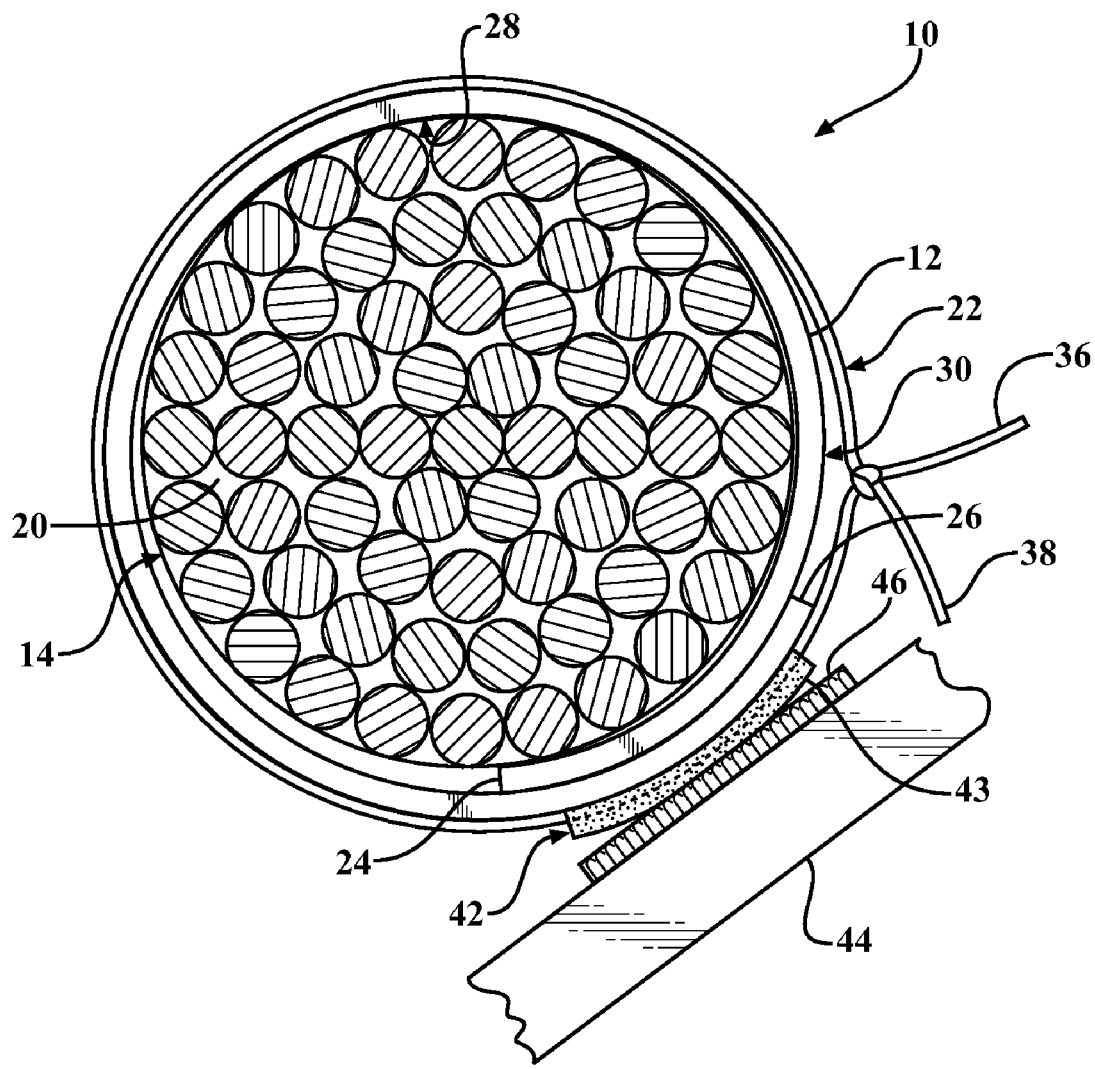
FIG. 3 is a schematic end view of the sleeve of FIG. 1 attached to a support member.

Each closure device 122 is shown as having has a second hook portion (hp') or a second loop portion (lp') on its outer face 130, wherein the second hook portion (hp') or a second loop portion (lp') is configured for attachment to other of the respective hook portion (hp) or loop portion (lp) on the support member 44 (see FIG. 3). As such, upon wrapping the strap or straps 122 about the wall 112 and fastening the respective first hook and first loop portions (hp), (lp) to one another, the second hook portion (hp') or a second loop portion (lp') is automatically configured facing outwardly for attachment to the support member 44. In addition, as shown, the second hook portion (hp') or second loop portion (lp') can be configured to overlie an elongate fastener 143 extending parallel or substantially parallel to the central axis 118, wherein the fastener 143 is represented as being one of a hook or loop portion 143 of a hook and loop type fastener, for example, as discussed above with regard to the fastener 43. Accordingly, when the straps 122 wrap over a portion of the fastener 143 with the corresponding hook portion (hp') or loop portion (lp') of the straps 122 being aligned with the fastener 143, the full length of the sleeve 110 is provided with one of the hook or loop portion, as desired, for attachment to the support member 44. Otherwise, if the straps did not include the same hoop or loop portions (hp'), (lp'), then the portion of the fastener 143 having the straps 122 in overlying relation therewith would not provide a source for attachment to the support member 44.

Figure 6:
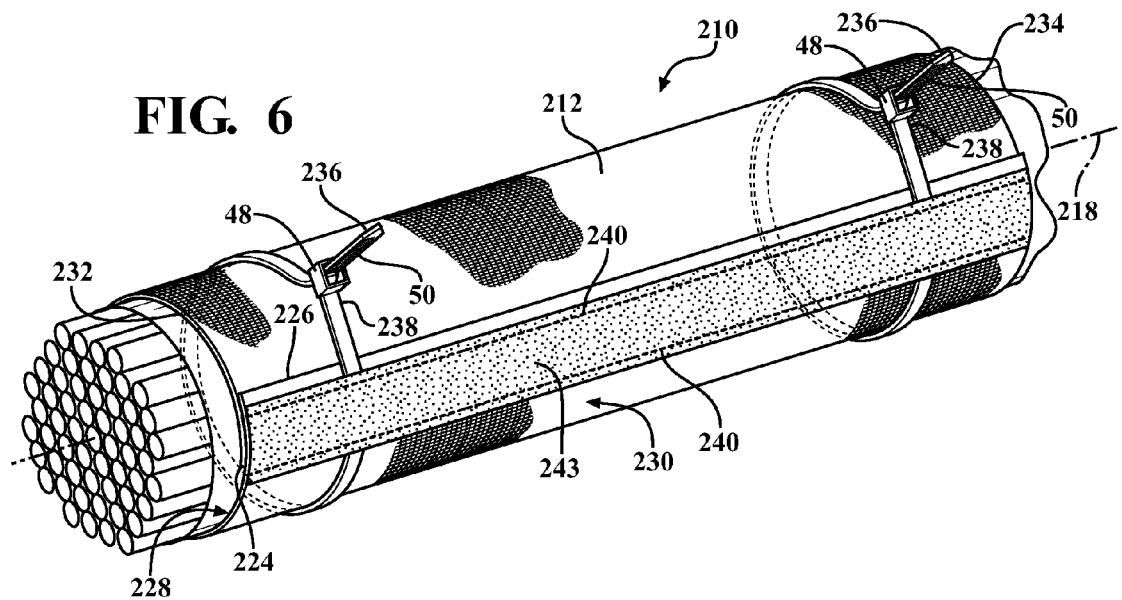
FIG. 6 is a schematic perspective partial view of a wrappable textile sleeve constructed in accordance with yet another aspect of the invention.
Figure 7:
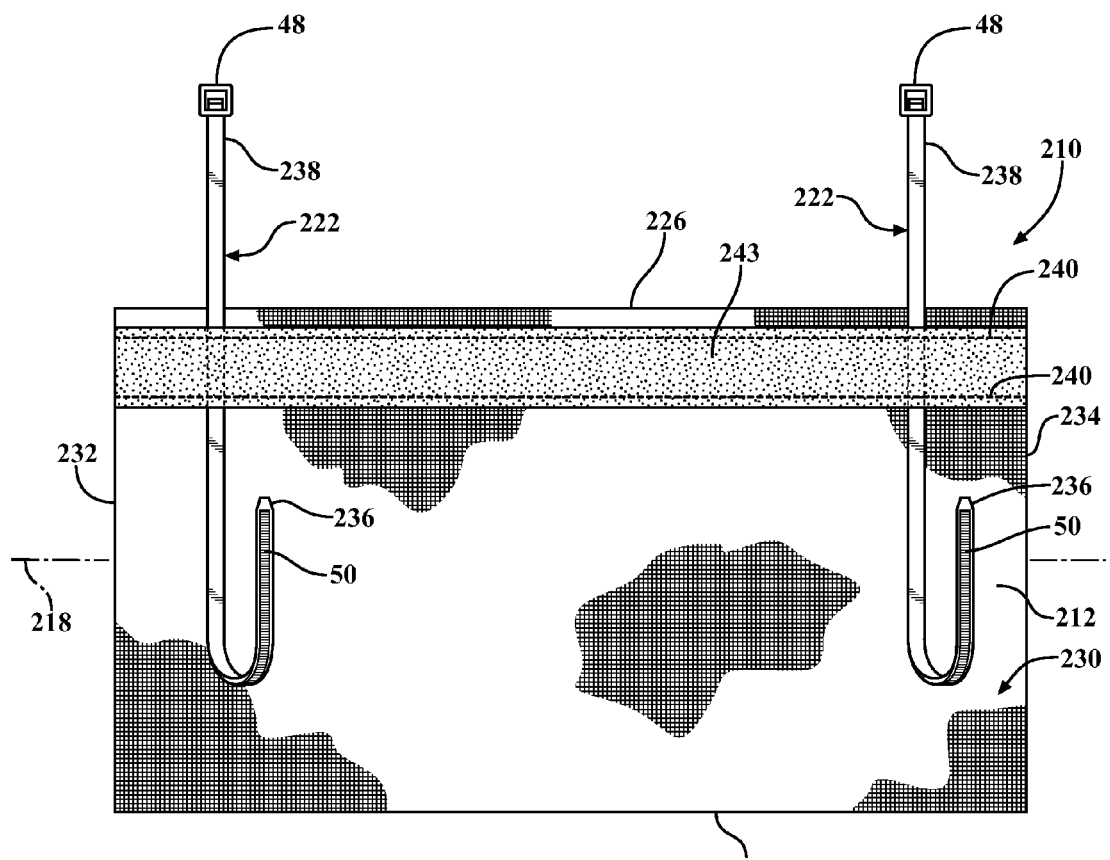
FIG. 7 is a schematic plan view of an outer face of the sleeve of FIG. 6 with the sleeve being shown in an unwrapped configuration.

In FIGS. 6 and 7, a sleeve 210 constructed in accordance with another aspect of the invention is illustrated, wherein the same reference numerals, offset by a factor of 200, are used as above to identify similar features. The sleeve 210 has a wall 212 constructed the same as discussed above with regard to the wall 12. Accordingly, the wall 212 has opposite inner and outer edges 224, 226, respectively, with oppositely facing inner and outer faces 228, 230, respectively, extending between the edges 224, 226. The edges 224, 226 extend parallel or substantially parallel to the central axis 218 and terminate at opposite ends 232, 234 of the wall 212.

At least one, and shown as a pair of closure members 222 are attached to the outer face 230 of the wall 212, such as via a stitched yarn 240. The closure members 222 are provided as elongate, flexible straps, shown here as tie wraps 222. The tie wraps 222 extend between opposite ends 236, 238, where one of the ends 238 has a fastening receptacle 48 and the opposite end 236 has fastening teeth 50 configured for locked receipt in the fastening receptacle 48. The tie wraps 222 are represented as being captured and stitched between an elongate fastener 243 and the outer face 230 of the wall 212, wherein the fastener 243 is represented as being one of a hook or loop portion 243 of a hook and loop type fastener, as discussed above, by way of example. The ends 236, 238 are shown as extending laterally outwardly from the sides 224, 226 of the wall 212 for attachment to one another upon wrapping the wall 212 about the elongate members 14 to be protected. As a result of the tie wraps 222 extending beneath the fastener 243, the full length of the fastener 243 is exposed for attachment to the fastener 46 on the support member 44.

Obviously, many modifications and variations of the present invention are possible in light of the above teachings. It is, therefore, to be understood that within the scope of the appended claims, the invention may be practiced otherwise than as specifically described.

What is claimed is:

1. A wrappable textile sleeve for routing and protecting elongate members, comprising:
    an elongate wall constructed from interlaced yarn, said elongate wall having opposite inner and outer edges extending parallel to a central longitudinal axis of said sleeve between opposite ends of said sleeve and having oppositely facing inner and outer faces extending between said inner and outer edges, said inner face bounding an inner cavity of said sleeve upon wrapping said outer edge in outwardly overlapping relation with said inner edge about said central longitudinal axis;
    an elongate fastener extending parallel to said central longitudinal axis adjacent said outer edge, said fastener facing outwardly from said outer face and being configured for attachment to an external support member; and
    a closure device integrally attached to said wall, said closure device extending transversely to said fastener and extending circumferentially about said wall of said sleeve for attachment to itself and maintaining said inner and outer edges in their overlapping relation, said closure device being captured between said outer face and said at least one fastener.

2. The wrappable textile sleeve of claim 1 wherein said fastener is one of a hook portion or a loop portion of a hook and loop fastener, said one of a hook portion or a loop portion being configured for attachment a hook portion or loop portion on the support member.

3. The wrappable textile sleeve of claim 2 wherein said fastener extends continuously between said opposite ends.

4. The wrappable textile sleeve of claim 1 further comprising a stitch attaching said fastener and said closure device to said outer face of said wall.

5. The wrappable textile sleeve of claim 1 wherein said closure device is a string.

6. The wrappable textile sleeve of claim 1 wherein said closure device is a strap having a first hook portion and a first loop portion configured for attachment to one another upon said closure device being wrapped circumferentially about said wall.

7. The wrappable textile sleeve of claim 6 wherein said closure device has a second hook portion or a second loop portion configured for attachment to a hook portion or loop portion on the support member.

8. The wrappable textile sleeve of claim 7 wherein said second hook portion or said second loop portion is configured for overlying alignment with said fastener.

9. The wrappable textile sleeve of claim 1 wherein said closure device is a tie wrap having one end with a receptacle and another end with teeth configured for locking receipt with said receptacle.

10. A wrappable sleeve for routing and protecting elongate members, comprising:

an elongate wall having opposite inner and outer edges extending parallel to a central longitudinal axis of said sleeve between opposite ends of said sleeve and having oppositely facing inner and outer faces extending between said inner and outer edges, said inner face bounding an inner cavity of said sleeve upon wrapping said outer edge in outwardly overlapping relation with said inner edge about said central longitudinal axis;

an elongate fastener attached to said outer face, said fastener extending parallel to said central longitudinal axis and facing outwardly from said outer face, said fastener being configured for attachment to an external support member; and a closure device integrally attached to said wall, said closure device extending transversely to said fastener and extending circumferentially about said wall for attachment to itself to maintain said inner and outer edges in overlapping relation, said closure device being captured between said outer face and said at least one fastener.

11. The wrappable textile sleeve of claim 10 wherein said fastener is one of a hook portion or a loop portion of a hook and loop fastener.

12. The wrappable textile sleeve of claim 10 wherein said closure device is a strap having a first hook portion and a first loop portion configured for attachment to one another upon said closure device being wrapped circumferentially about said wall.

* * * * *